(12) United States Patent
Beck et al.

(10) Patent No.: US 8,113,323 B2
(45) Date of Patent: Feb. 14, 2012

(54) SELF-PUMPING HYDROPNEUMATIC SPRING STRUT WITH INTERNAL LEVEL CONTROL

(75) Inventors: Hubert Beck, Eitorf (DE); Klaus Schmitz, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 404 days.

(21) Appl. No.: 11/827,811

(22) Filed: Jul. 13, 2007

(65) Prior Publication Data
US 2008/0029939 A1    Feb. 7, 2008

(30) Foreign Application Priority Data
Aug. 5, 2006    (DE) .......................... 10 2006 036 695

(51) Int. Cl.
*B60G 17/00*    (2006.01)
(52) U.S. Cl. .................. 188/315; 188/322.13; 267/64.17
(58) Field of Classification Search ............... 267/64.17, 267/DIG. 2; 137/539, 543.19; 188/322.13–322.15, 188/297, 313–318
See application file for complete search history.

(56) References Cited

U.S. PATENT DOCUMENTS

| 4,365,648 | A  | * | 12/1982 | Grothe ......................... | 137/539 |
| 6,234,462 | B1 |   | 5/2001  | Beck et al. |   |
| 6,244,295 | B1 | * | 6/2001  | Bartussek et al. ............ | 137/540 |
| 7,287,546 | B2 | * | 10/2007 | Konishi ........................ | 137/540 |
| 7,819,132 | B2 | * | 10/2010 | Etheridge et al. ............. | 137/539 |

FOREIGN PATENT DOCUMENTS

| DE | 196 48 859 | 5/1998 |
| GB | 2159235 A * | 11/1985 |

* cited by examiner

*Primary Examiner* — Robert Siconolfi
*Assistant Examiner* — Anna Momper
(74) *Attorney, Agent, or Firm* — Cozen O'Connor

(57) ABSTRACT

An oil-filled working cylinder is divided into first and second working spaces by a working piston, the first working space being connected to a high pressure chamber. A piston pump includes a pump rod received in a pump cylinder formed by the hollow piston rod, the pump rod having a bore connected to a low pressure chamber via a discharge valve, a distal end provided with a suction valve, and a down-regulating opening connecting the bore to the first working space as a function of the position of the working piston, the pump cylinder being connected to the first working space by an outlet valve. At least one of the valves is a check valve including a housing having a bore, a ball reciprocably guided in the bore by guide ribs, and a resilient retaining element capturing the ball in the bore and spring-loading the ball toward a valve seat.

16 Claims, 6 Drawing Sheets

SELF-PUMPING HYDROPNEUMATIC SPRING STRUT WITH INTERNAL LEVEL CONTROL

BACKGROUND OF THE INVENTION

1. Field of the Invention

The invention pertains to a self-pumping hydropneumatic spring strut with internal level control, especially for motor vehicles, with an oil-filled working cylinder under the pressure of at least one gas cushion located in a high-pressure chamber and acting as a spring, the working cylinder being divided into two working spaces by a working piston carried by a hollow piston rod. A piston pump is driven by the movements of the spring and conveys oil from a low-pressure chamber into the working space connected to the high-pressure chamber, the pump cylinder of the piston pump being formed by the hollow piston rod, into which a hollow pump rod, which is attached to the working cylinder and carries at its forward end a suction valve, travels, the bore of the hollow pump rod being connected to the low-pressure chamber. A down-regulating opening can be closed as a function of the position of the working piston in the working cylinder, and connects the working space connected to the high-pressure chamber to a down-regulating channel, which is itself equipped with a throttle and/or check valve and which opens out into the low-pressure chamber. Fluid flows through the check valve and/or the throttle in the suction direction, and that the pump cylinder is connected to the high-pressure-side working space by an outlet valve.

2. Description of the Related Art

Self-pumping hydropneumatic spring struts with internal level control are already known (e.g., U.S. Pat. No. 6,234,462, DE 196 48 859 C2), in which the working cylinder is divided by a working piston carried by a hollow piston rod into two working spaces, and in which a piston pump, which is driven by the movements of the spring and conveys oil from a low-pressure chamber into the working space connected to the high-pressure chamber, is provided. The piston pump consists of a pump cylinder, which is formed by the hollow piston rod, into the forward end of which the hollow pump rod, which carries a suction valve, travels. In this state of the art, a total of three spring-loaded check valves is provided, i.e., an inlet valve, an outlet valve, and a discharge valve. The inlet and outlet valves are necessary for the pumping work of the piston pump, and the discharge valve is necessary for the throttled discharge of the damping medium when the load being imposed by the vehicle body is removed. The disadvantage is that each of these valves has a different design, which means that the associated multiplicity of parts requires a not inconsiderable amount of work with respect to logistics and assembly. In particular, spring-loaded plate valves are so large that they cannot be installed in a relatively small-diameter pump rod.

SUMMARY OF THE INVENTION

An object of the invention is to create a low-noise check valve which can be operated at high-frequency, which occupies a minimum of space, and which can be produced at low cost under mass production conditions.

To accomplish this task, at least one valve (discharge valve, inlet valve, outlet valve) is designed in such a way that a ball is provided as the valve body, which is guided in the bore by at least two guide ribs, and that a retaining element located in the terminal area of the bore captures the ball and simultaneously spring-loads it.

It is advantageous here that a ball is used as the valve body and that this ball is guided with precision between the guide ribs. The retaining element, in the form of a contoured spring disk with an opening in the center, acts on the ball in such a way that the ball can open the valve against the force of the spring but is limited in its stroke at the same time. To minimize noise, the stroke of the ball is also limited elastically.

According to another feature, the guide ribs are distributed uniformly around the circumference of the bore.

According to another essential feature, the retaining element has at least one radially inward-directed projection, which serves to limit the stroke of the valve body. It is advantageous here for the stroke of the ball to be limited by the projections, which are designed to act as springs, but which, as a result of their progressive spring characteristic, are also able to limit the stroke in the desired manner.

According to another embodiment, the retaining element has at least one radially inward-directed spring tongue, which keeps the valve body under elastic pretension. It is advantageous here that the spring tongue is also an integral part of the retaining element, so that the projections, the spring tongue, and the retaining element can be produced out of a single piece of material. To ensure that the flow is throttled to the least possible extent, the guide ribs extend axially over only part of the bore. It is advantageous here for the guide ribs to have a free area underneath the retaining element, so that the fluid can flow smoothly through the check valve.

According to another embodiment, the retaining element is held positively in place in the housing. It is advantageous here to hold the retaining element positively in place by peening over parts of the material of the housing.

According to another embodiment, the radial projections are capable of elastic movement in the axial direction.

The retaining element can be held in place positively in the valve housing, but it is also possible for the retaining element to be bonded to the housing with an adhesive. It is advantageous to use an adhesive, but welding or soldering is also conceivable.

According to another exemplary embodiment, the housing is an undercut-free, as-molded part.

According to another embodiment, there is at least a partial free area between the guide ribs of the housing and the retaining element.

It is advantageous here for the housing to be produced by sintering or pressing.

According to another feature, the retaining element is a disk-shaped component which allows a flowing medium to pass through, while its center part exerts elastic force on the valve body.

According to another essential feature, the retaining element has a closed, circular outer area, from which a spring tongue extends all to the way to the center.

It is advantageous for the spring tongue to be in the form of a circle or spiral so that a softer spring characteristic can be obtained.

The retaining element may be produced by stamping or may be shaped out of a piece of spring wire.

According to another embodiment, the retaining element has a compression-resistant outer area suitable for the peening process.

It is advantageous for the retaining element to be held in place on the housing by means of a claw-type connection.

According to another feature, the housing has a cutting edge on at least one end surface, so that it can be installed tightly in a receiving bore.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
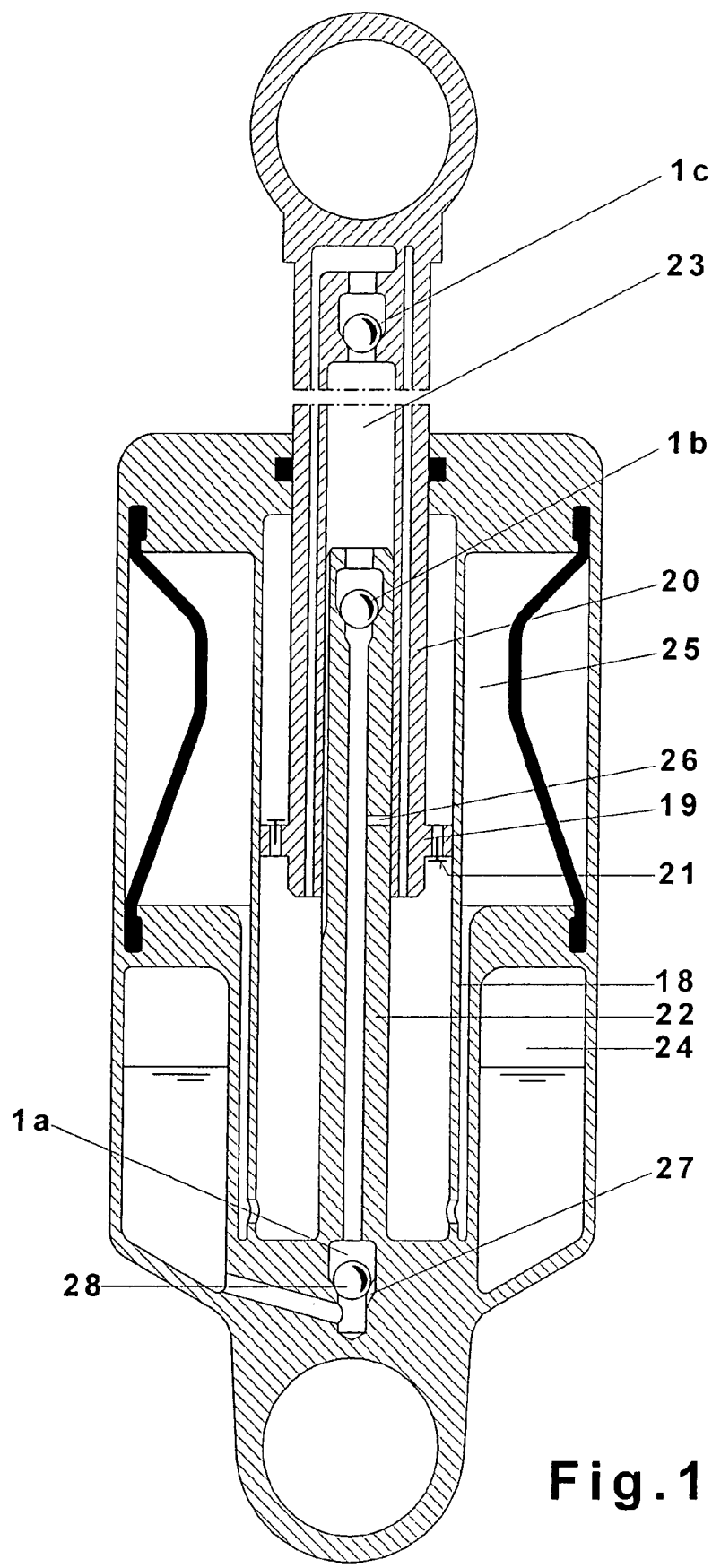
FIG. 1 shows a cross section of a self-pumping hydropneumatic spring strut.

The spring strut for motor vehicles shown in FIG. 1 includes a the working cylinder 18, in which a piston 19, mounted on the end of a piston rod 20, slides. The working cylinder 18 is connected underneath the piston 19 to the high-pressure chamber 25. The unit is attached to the body of a vehicle and to the axle of the vehicle in a manner not shown in the figure. During the operation of the vehicle, the damping forces are generated by the damping valves 21.

The spring strut according to FIG. 1 shows an oil pump, which consists of the pump rod 22 and the pump cylinder 23, which is formed by the hollow piston rod 20. The movements of the vehicle axle caused by irregularities in the pavement actuate this oil pump, which continuously conveys oil in a controlled manner through the suction valve 1b, out of the low-pressure chamber 24 via the outlet valve 1c into the working cylinder and thus into the high-pressure chamber 25. As a result, the piston 19 and the piston rod 20 are pushed outward until the dynamic level control begins through the formation of a bypass. When the load on the system is removed, the down-regulating opening 26 in the pump rod 22 is released, and the vehicle is down-regulated, i.e., returned to its original level.

The essential purpose of the discharge valve 1a is to open wide in the suction direction and to produce a throttling effect in the discharge direction, so that the vehicle body can be down-regulated gently. The advantage of this valve is that the discharge notch 27 can be opened by the rising valve body 28 during the suction stroke and thus can be flushed free of dirt particles. This helps to prevent the danger of clogging at this narrow throttle point. The down-regulating opening 26 has no throttling effect because of its size and is therefore not subject to the danger of clogging.

Figure 2:
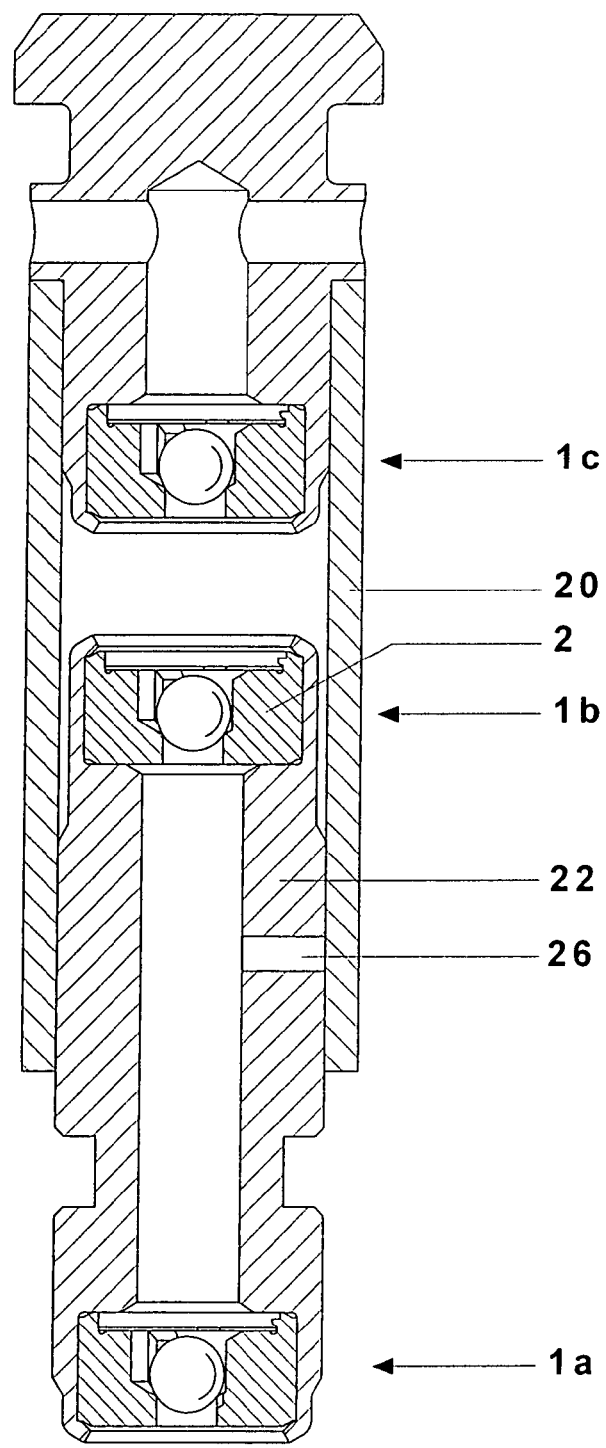
FIG. 2 shows a cross-sectional view of a piston rod and a pump rod in isolation with the appropriate number of valves.

FIG. 2 shows part of a piston rod 20, a pump rod 22, and the valves 1a, 1b, and 1c in isolation. The down-regulating opening 26, as already described on the basis of FIG. 1, can also be seen in the pump rod 22.

Figure 3:
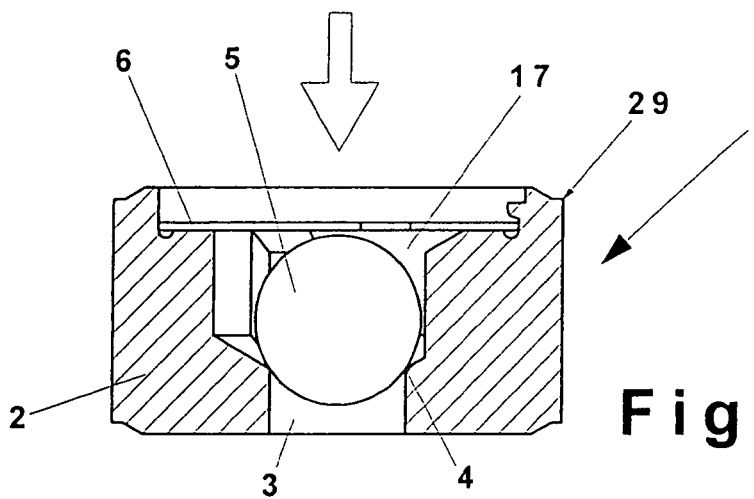
FIGS. 3-5 show partial cross sections from the side and a top view of a check valve.

FIG. 3 shows the check valve 1 with a housing 2, which preferably can be produced without any undercuts, i.e., as-molded, without the need for any finish machining, ready for use just as it comes from the mold. A sintering or pressing technique is preferred for the production of this housing.

The housing 2 has a central inflow bore 3, which forms the valve seat 4 at the transition to the bore 17. In the area of its valve seat 4, the inflow bore 3 is closed by the valve body 5, designed as a ball. Above the valve body 5 there is a retaining element 6, in the form of an internally contoured spring disk, which is arranged in such a way that its outer edge is permanently connected to the housing 2, while its inner area exerts elastic force either directly or at least approximately on the center of valve body 5.

The housing 2 has a cutting edge 29 on at least one end surface, which allows it to be installed tightly in a receiving bore.

Figure 4:
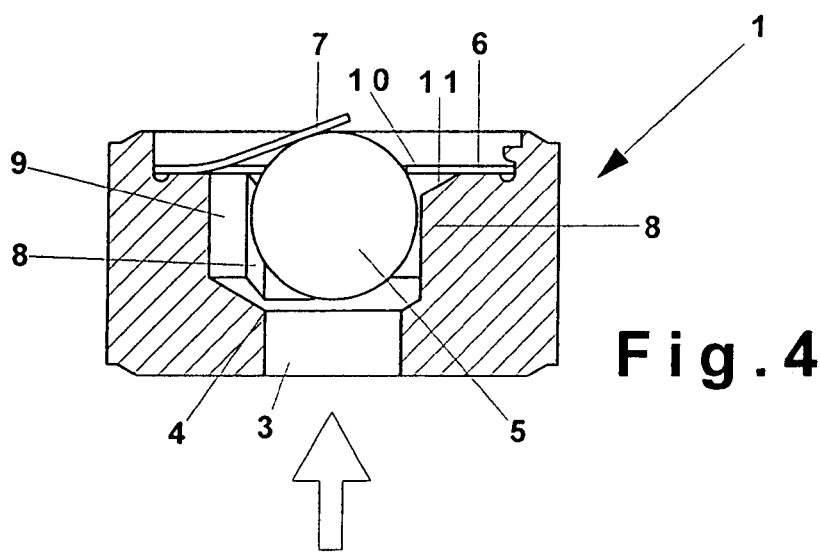

FIG. 4 shows the check valve 1 of FIG. 3 in the open position, where the valve body 5 has been lifted from the valve seat 4 against the elastic force of the retaining element 6, i.e., the force of its spring tongue 7, by the flow arriving through the inflow bore 3.

The valve body 5 is centered by guide ribs 8. The flow passes around the valve body 5 at least partially via longitudinal channels 9 on the circumference and then passes through the remaining open area of the retaining element 6, the stroke of the valve body 5 being limited by the three projections 10 of the retaining element 6.

The end stop of the valve body 5 can be spring-loaded and thus also have the effect of minimizing noise. To ensure that the flow is throttled to the minimum possible extent, the guide ribs 8 have a free area 11 underneath the retaining element 6, especially in the case of the smallest sizes of these check valve designs. The shape of the free area can be individually adapted.

Figure 5:
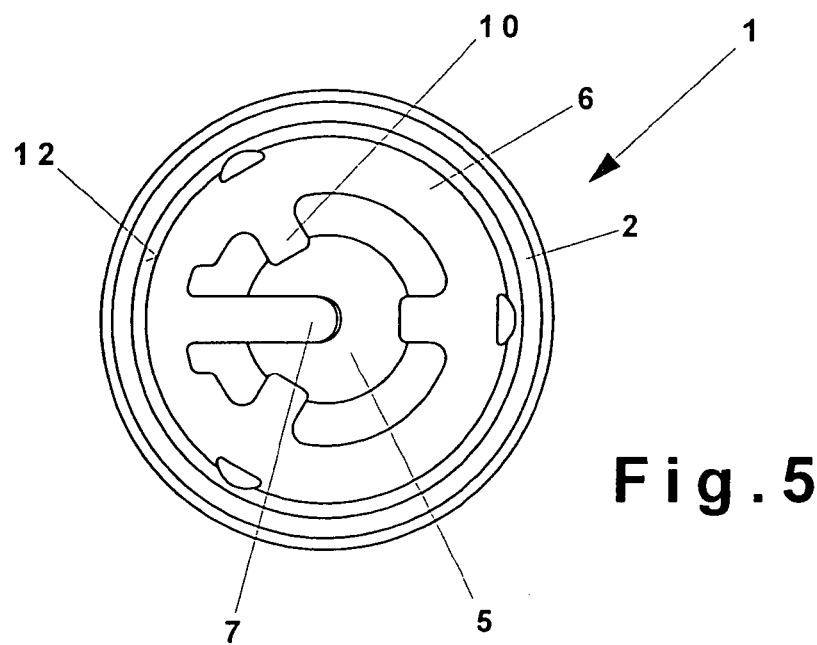

FIG. 5 shows a top view of the check valve 1 illustrated in FIG. 1 with a housing 2 and a retaining element 6, which is designed in the form of a flat spring disk. The retaining element 6 is flat, because this facilitates handling in bulk, and it can thus be placed in the centering recess 12 of the housing 2 by machine without having to worry about its angular orientation or having to determine which is the right side and which the wrong side. The retaining element 6 has a spring tongue 7, which acts elastically on the valve body 5, where the three projections 10 serve as an end stop for the valve body 5 in the axial direction. Depending on the stiffness of the spring tongue 7, the projections 10 can be eliminated entirely, because the maximum outward travel of the valve body 5 caused by the flow is often very short. The spring tongue 7 will then stop the valve body 5 by itself by virtue of its own stiffness.

The opening pressure of the check valve and the stroke can be varied as desired by appropriate choice of the retaining element 6, e.g., through choice of its inner contours and/or its thickness. The retaining element 6 is permanently attached to the housing 2 by a positive connection, for example, or by a claw-type connection, by adhesive bonding, or by welding.

Figure 6:
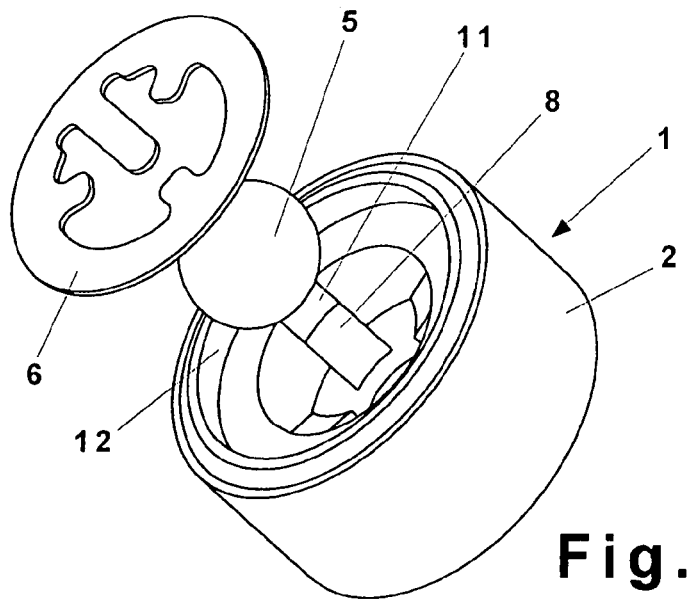
FIGS. 6-8 show exploded views of the check valve illustrated in FIGS. 3-5.

FIG. 6 shows an exploded perspective of a highly miniaturized check valve 1 with the housing 2, the valve body 5, and the retaining element 6. To optimize the flow, the guide ribs 8 have a free area 11 at the top, so that the retaining element can be inserted into the centering bore 12 of the housing 2 without having to occupy any predetermined position.

Figure 7:
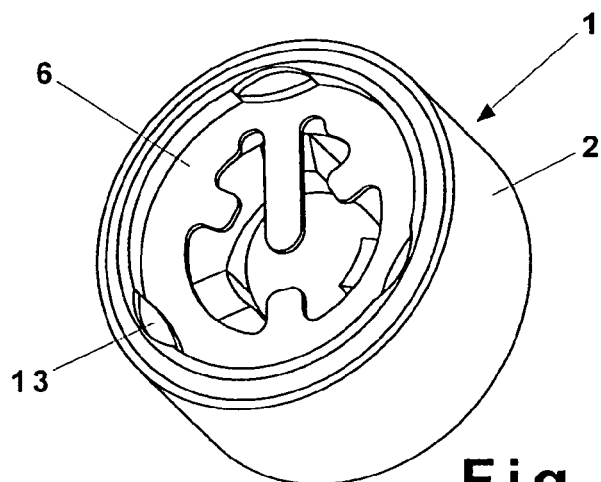

FIG. 7 shows the completely assembled check valve 1, where the retaining element 6 is permanently connected to the housing 2 by localized peening 13.

Figure 8:
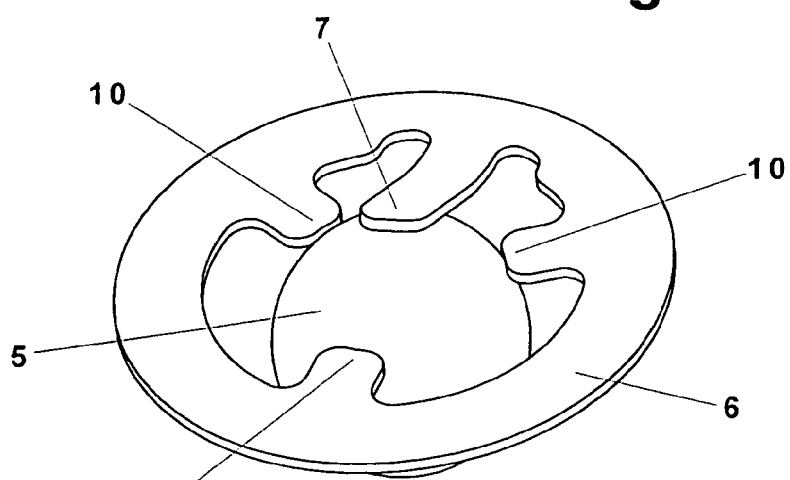

FIG. 8 shows the retaining element 6 together with the valve body 5 in a position in which the valve body 5 has actuated the spring tongue 7 in such a way that the projections 10 are acting as an end stop.

Figure 9:
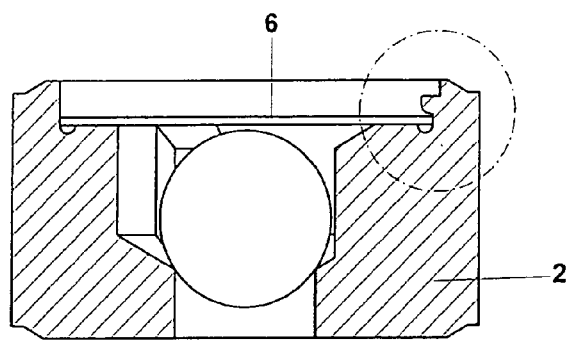
FIGS. 9-9d show various way in which the retaining element can be held in place on the valve housing.
Figure 9A:
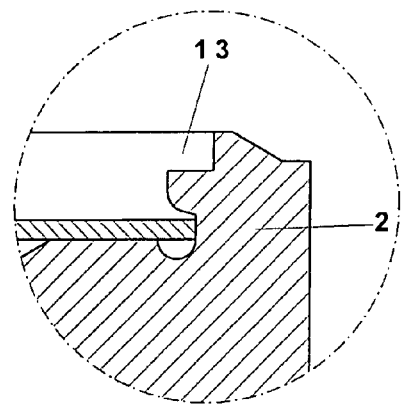
Figure 9B:
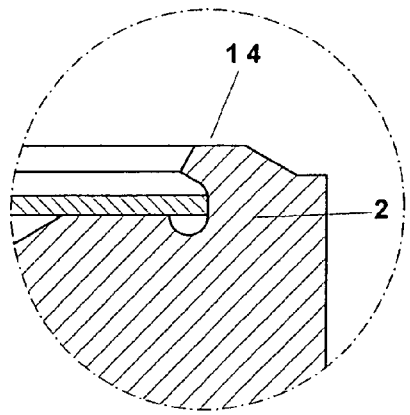
Figure 9C:
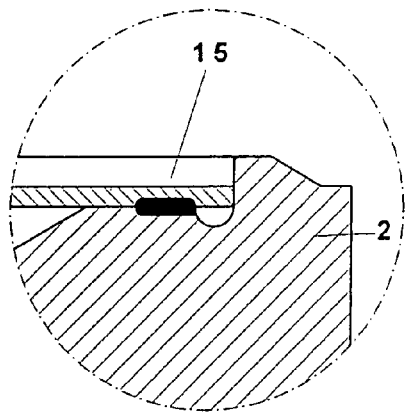
Figure 9D:
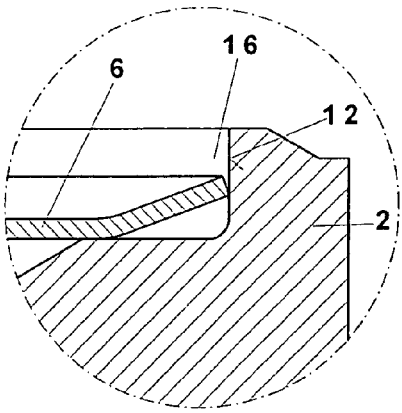

FIGS. 9-9*d* show various ways in which the retaining element 6 can be attached to the housing 2. FIG. 9 shows the principle, illustrated in FIG. 3, of fastening the retaining element 6 to the housing 2 by means of localized peening. A magnified view of this localized peening 13 can be seen in FIG. 9*a*. The localized peening can be provided at several points distributed around the circumference of the housing 2.

FIG. 9*b* shows a housing 2, in which a peening 14 has been performed all the way around; that is, the entire circumference has been peened over. FIG. 9*c* shows a welded or adhesively bonded joint 15.

FIG. 9*d* shows a retaining element 6 with an angled area at the outer edge, which forms a claw-type connection 16 when the element is pressed into the housing 2. The retaining element 6 is therefore held positively in place in the centering bore 12 of the housing 2 by means of the corresponding interference fit.

Figure 10:
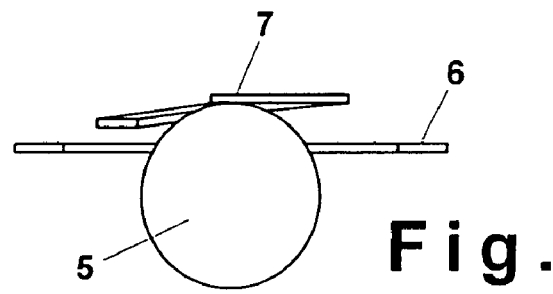
FIGS. 10-12 show additional designs of the retaining element.

FIG. 10 is a cross-section showing a retaining element 6, which is supported elastically by its spring tongue 7 on the valve body 5.

Figure 11:
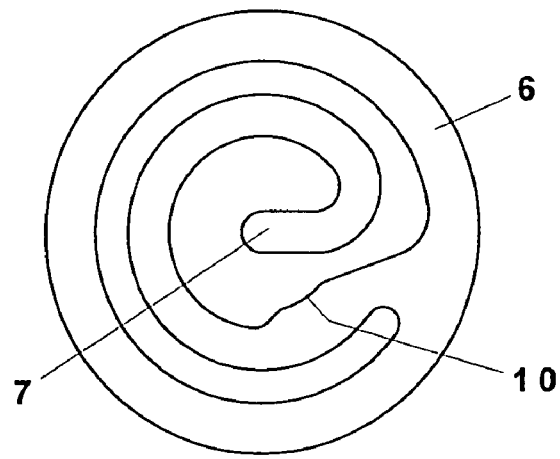

FIG. 11 shows a top view of the retaining element 6 of FIG. 10. A projection 10, which ultimately limits the stroke of the valve body 5, can be omitted, depending on the stiffness of the spring. Depending on the design of the spring tongue 7, it is also possible for the valve body 5 to make early contact with the retaining element 6, if desired, so that the stroke can be limited in the desired manner. The spring tongue 7 is designed here with a circular or spiral shape because of the desire for a softer spring.

Figure 12:
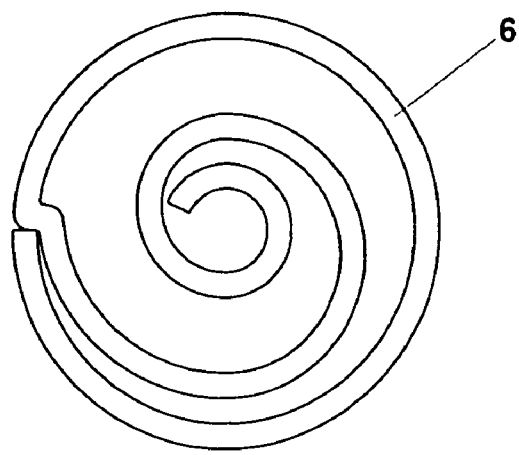

FIG. 12 shows a retaining element 6 of spring steel wire. The outer edge is circular and designed to be resistant to deformation to allow peening of the housing.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A self-pumping hydropneumatic spring strut with internal level control, the strut comprising:
    an oil-filled working cylinder divided into first and second working spaces by a working piston carried by a hollow piston rod, said first working space being connected to a high pressure chamber under the pressure of a gas cushion; and
    a piston pump which conveys oil from a low pressure chamber to the high pressure chamber, the piston pump comprising a pump rod received in a pump cylinder formed by the hollow piston rod, the pump rod being fixed in the working cylinder and having a bore connected to the low pressure chamber via a discharge valve, the pump rod having a distal end provided with a suction valve, and a down regulating opening between the discharge valve and the suction valve, the opening connecting the bore to the first working space as a function of the position of the working piston in the working cylinder, the pump cylinder being connected to the first working space by an outlet valve;
    wherein at least one of the discharge valve, the suction valve, and the outlet valve is a check valve comprising a housing having a bore with a circumferential wall formed with a plurality of guide ribs, a ball reciprocably guided in the bore by the guide ribs, and a resilient retaining element fixed in the housing over the bore, the retaining element capturing the ball in the bore and spring-loading the ball, the retaining element including at least one radially inward directed projection having a first end fixed to the retaining element and a second free end, the projection being axially resilient and limiting movement of the ball, the retaining element further including a closed circular outer area, a center, and a spiral-shaped spring tongue extending spirally from the outer area to the center,
    wherein the spiral-shaped spring tongue has a first radially outer fixed end connected to the outer area and a second radially inner free end; and wherein the at least one projection has an arcuate portion configured to mate with an outer surface of the ball.

2. The spring strut of claim 1 wherein the guide ribs are distributed uniformly around the circumferential wall.

3. The spring strut of claim 1 wherein the spring tongue exerts a resilient force on the ball.

4. The spring strut of claim 1 wherein the guide ribs extend axially over only part of the bore.

5. The spring strut of claim 1 wherein the retaining element is positively retained in the housing.

6. The spring strut of claim 5 wherein the retaining element is held in place by peened-over parts of the housing.

7. The spring strut of claim 1 wherein the retaining element is attached to the housing by an adhesive bond.

8. The spring strut of claim 1 wherein the housing is an undercut-free, as-molded part.

9. The spring strut of claim 1 wherein the guide ribs are spaced from the retaining element.

10. The spring strut of claim 1 wherein the housing is formed by one of sintering and pressing.

11. The spring strut of claim 1 wherein the retaining element is formed with apertures which permit fluid to flow therethrough while the retaining element exerts a resilient force on the ball.

12. The spring strut of claim 1 wherein the retaining element is stamped from sheet material.

13. The spring strut of claim 1 wherein the retaining element has a deformation-resistant outer area to allow peening of the housing.

14. The spring strut of claim 1 wherein the retaining element is formed with a circumferential claw which is received in the housing in an interference fit.

15. The spring strut of claim 1 wherein the housing has an end surface formed with a circumferential cutting edge so that the check valve can be installed in a receiving bore in an interference fit.

16. The spring strut of claim 1, wherein the spring tongue is a solid member.

* * * * *